United States Patent
Andresen et al.

(10) Patent No.: US 9,041,248 B2
(45) Date of Patent: May 26, 2015

(54) CONTROL OF THE DISTRIBUTION OF ELECTRIC POWER GENERATED BY A WIND FARM BETWEEN AN AC POWER TRANSMISSION LINK AND A DC POWER TRANSMISSION LINK

(75) Inventors: Björn Andresen, Ostbirk (DK); Sathees Kumar, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 609 days.

(21) Appl. No.: 13/345,800

(22) Filed: Jan. 9, 2012

(65) Prior Publication Data

US 2012/0181879 A1 Jul. 19, 2012

(30) Foreign Application Priority Data

Jan. 18, 2011 (EP) .................................... 11151228

(51) Int. Cl.
*H02J 1/10* (2006.01)
*H02J 3/02* (2006.01)
*H02J 3/38* (2006.01)
*H02J 3/36* (2006.01)

(52) U.S. Cl.
CPC .... *H02J 3/02* (2013.01); *H02J 3/36* (2013.01); *H02J 3/386* (2013.01); *Y02E 10/763* (2013.01); *Y02E 60/60* (2013.01)

(58) Field of Classification Search
USPC ............................................ 307/43, 84, 151
See application file for complete search history.

(56) References Cited

U.S. PATENT DOCUMENTS 7,839,024 B2 * 11/2010 Cardinal et al. ................ 307/84
2010/0156189 A1 6/2010 Fishman

FOREIGN PATENT DOCUMENTS

| CN | 1691464 A | 11/2005 |
|---|---|---|
| WO | WO 03007455 A1 | 1/2003 |
| WO | WO 2007027141 A1 | 3/2007 |
| WO | WO 2009135728 A2 | 11/2009 |

OTHER PUBLICATIONS

S.K. Chaudhary, R. Teodorescu, P. Rodriguez: "Wind Farm Grid Integration Using VSC Based HVDC Transmision—An Overview", Energy 2030 Conference, Piscataway, USA, pp. 1-7, XP031442506; Others; 2008.

(Continued)

*Primary Examiner* — Carlos Amaya

(57) ABSTRACT

A power distribution system for distributing electric power generated by a wind farm between an AC power transmission link and a DC power transmission link is provided. Both power transmission links connect the wind farm to a substation of a power grid. The power distribution system includes a central wind farm controller and a distribution device. In response to a control signal from the central wind farm controller, the distribution device distributes the generated electrical power between the two power transmission links. It is further described a power transmission system with the above described power distribution system and a method for distributing electric power between an AC power transmission link and a DC power transmission link.

9 Claims, 1 Drawing Sheet

(56) References Cited

OTHER PUBLICATIONS

A. D. Hansen, P. Sörensen, F. Iov, F. Blaabjerg: "Centralised power control of wind farm with doubly fed induction generators", Renewable Enrgy, Pergamon Press, Oxford, GB, vol. 31, No. 7, pp. 935-951, XP025105579; Others; 2006.

W. Leonhard: "Electrical Engineering between Energy and Information", Power Electronics and Motion Control Conference, Piscataway, USA, vol. 1, pp. 197-202, XP010522842; Others; 2000.

* cited by examiner

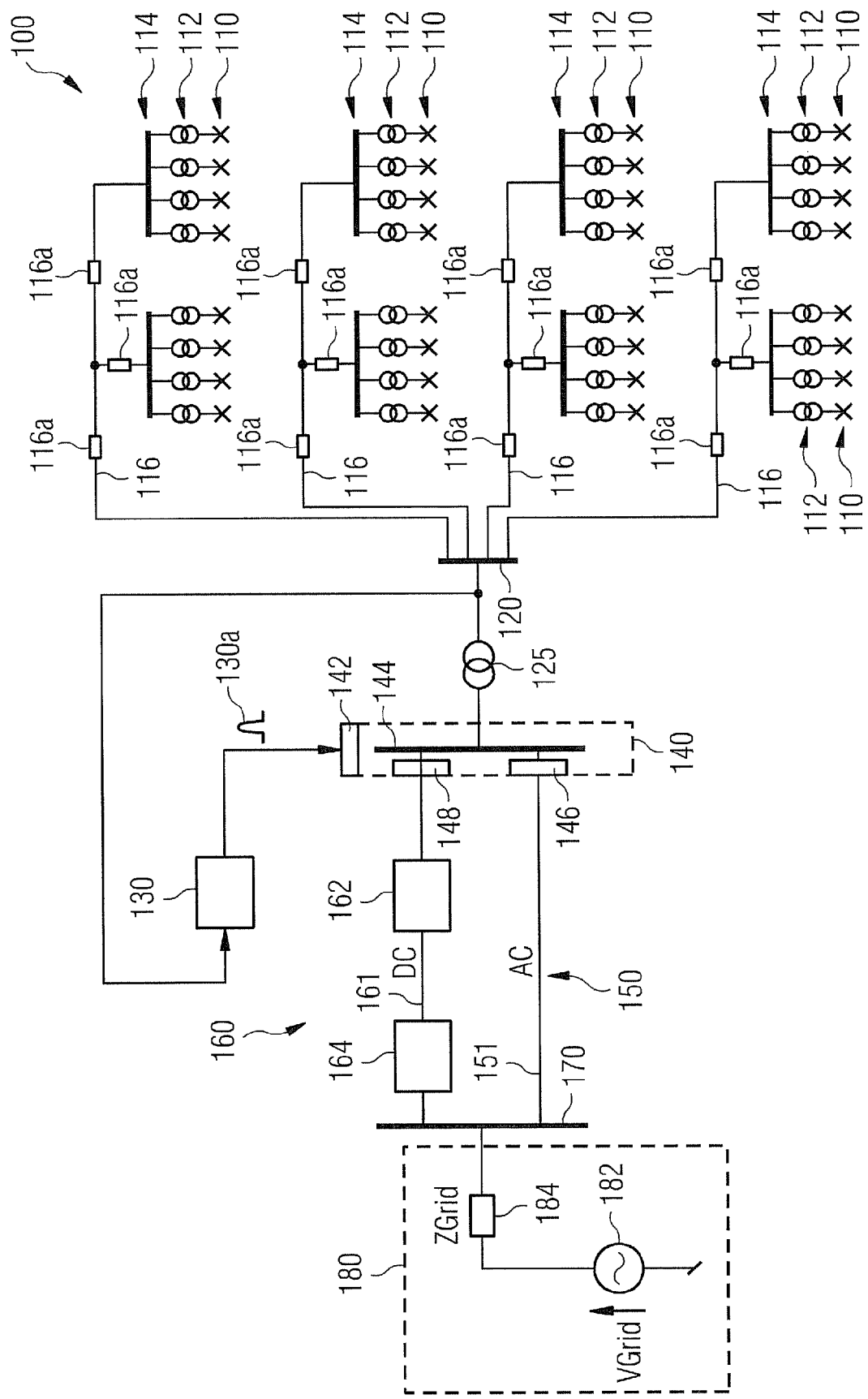

CONTROL OF THE DISTRIBUTION OF ELECTRIC POWER GENERATED BY A WIND FARM BETWEEN AN AC POWER TRANSMISSION LINK AND A DC POWER TRANSMISSION LINK

CROSS REFERENCE TO RELATED APPLICATIONS

This application claims priority of European Patent Office Application No. 11151228.1 EP filed Jan. 18, 2011. All of the applications are incorporated by reference herein in their entirety.

FIELD OF INVENTION

The present claimed invention relates to the technical field of transmitting electrical power, which has been generated by a wind farm comprising a plurality of wind turbines, from the wind farm to a power grid. In particular, the present claimed invention relates to a power distribution system for distributing electric power generated by a wind farm with a plurality of wind turbines between (a) an AC power transmission link and (b) a DC power transmission link, wherein both power transmission links connect the wind farm to a substation of a power grid. Further, the present claimed invention relates to power transmission system comprising the above described power distribution system. Furthermore, the present claimed invention relates to a method for distributing electric power generated by a wind farm with a plurality of wind turbines between (a) an AC power transmission link and (b) a DC power transmission link and to a central wind farm controller and a computer program, which are both configured for controlling the above described method.

ART BACKGROUND

Wind power generation has received a major impetus due to ever increasing demand for energy, depleting fossil fuel reserves and environmental benefits in particular with respect to the emission of greenhouse gases.

Wind turbines convert wind energy into electrical power. A wind farm or wind park, also known as wind power plant, is a collection of a few tens or a few hundreds of wind turbines installed in close vicinity with respect to each other. Within a wind farm the electric power generated by the various wind turbines is aggregated at a common collector bus (bus bar), which hereinafter is also denominated a Point of Common Coupling (PCC).

The electric power aggregated at the common collector bus has to be fed into a power grid for transmission and distribution to electric load centers and utilities located typically far away (e.g. hundreds of km). This requires that the wind farm is connected to the power grid by means of an electric high power connection. A cable transmission is required (a) for submarine power transmission (in case of offshore wind farms) and (b) for underground transmission onshore so as to connect the common collector bus to a sufficiently strong point in the grid. High Voltage Alternating Current (HVAC) and High Voltage Direct Current (HVDC) are the two alternatives for the connection of the wind farm to the grid as shown in the publication "Wind Farm Grid Integration Using VSC Based HVDC Transmission—An Overview", S. K. Chaudhary, R. Teodorescu, P. Rodriguez, IEEE Energy2030, Atlanta, Ga. USA, 17-18 Nov., 2008.

At present most of the wind farms are connected to a main land substation of a power grid via an AC cable carrying the electric power. However, not only the active power but also the reactive power caused in particular by the capacitance of the AC cable creates an electric loss as the total current is comprised by a real and imaginary part.

WO 2010/086071 A1 discloses a method for controlling a HVDC link with Voltage Source Converters (VSC) and interconnecting two electric power systems (e.g. a wind turbine and a substation of a power grid). A model-predictive control with a receding horizon policy is employed for controlling the outer loop of a two-loop or two-layer control scheme or setup for the HVDC link. The two-loop control scheme takes advantage of the difference in speed of the dynamics of the various system variables of the HVDC link and the interconnected power systems.

Asea Brown Boveri (ABB) has published an article with the title "HVDC Light in wind farm applications". In this article, which was available e.g. on Dec. 23, 2010, it is proposed to connect a wind farm with a power grid by means of both a HVAC link and a HVDC link. Energy losses being related to the transmission can be reduced by using the HVAC link at low wind speeds (e.g. 60% of the time) and both links, HVAC and HVDC, are used at high wind speed. In this way an optimum of total losses and system performance is obtained at all wind conditions.

SUMMARY OF THE INVENTION

There may be a need for further improving the transmission of electric energy between a wind farm and a substation of a power grid in particular with respect to losses.

This need may be met by the subject matter according to the independent claims. Advantageous embodiments of the present claimed invention are described by the dependent claims.

According to a first aspect of the claimed invention there is provided a power distribution system for distributing electric power generated by a wind farm with a plurality of wind turbines between an AC power transmission link and a DC power transmission link, wherein both power transmission links connect the wind farm to a substation of a power grid. The provided power distribution system comprises (a) a central wind farm controller, which is adapted for controlling the operation of the plurality of wind turbines, and (b) a distribution device, which is connectable at its input side to the wind farm and at its output side to both power transmission links. In response to a control signal, which is provided by the central wind farm controller, the distribution device distributes the generated electrical power between the AC power transmission link and the DC power transmission link.

The described power distribution system is based on the idea that the central wind farm controller, which is used for coordinating the operation of the plurality of wind turbines of the wind farm can also be used for distributing the transmission of electrical power, which has been produced by the wind farm, between the Alternating Current (AC) power transmission link and the Direct Current (DC) power transmission link.

In other words, the central wind farm controller may choose between three different modes for transmitting the generated electric power to the power grid respectively the power grid substation. A first mode is the so called AC mode, wherein only the AC power transmission link, which is often also called a High Voltage Alternating Current (HVAC), is used. A second mode is the so called DC mode, wherein only the DC power transmission link, which is often also called a High Voltage Direct Current (HVDC), is used. A third mode is the so called parallel mode, wherein both power transmission links are used for transmitting the power, which has been generated by the wind farm, to the power grid.

By distributing the electric power transmission between the two power transmission links power losses can be reduced and the wind farm can be connected to the substation, which is the responsible local power grid connection point, in a more efficient way.

The described power distribution system may be in particular advantageous for wind farms at rural places such as e.g. in Australia and in the USA, where wind farms are used in addition to a central power generation plant (e.g. a coal power plant, gas power plant, nuclear power plant) and where these wind farms are typically connected many miles away from such a central power generation plant.

Generally speaking, the central wind farm controller may help controlling the flow of power, which has to be transmitted from the wind farm to the power grid, after the electric connection between the wind farm and the power grid has been extended by adding the DC power transmission link to an ordinary AC power transmission link.

The described control signal, which may be in particular generated at the central wind farm controller, can be forwarded to the distribution device by means of a wired connection (e.g. electric cable), an optical connection (e.g. an optical fiber cable) and/or a wireless connection (e.g. a radio link).

According to an embodiment of the claimed invention the control signal depends on the amount of electric power which is generated by the wind farm.

Generally speaking, the central wind farm controller is configured to control the power distribution between the AC power transmission link and the DC power transmission link depending on the amount of electric power which is generated by the wind farm and which is supposed to be transmitted to the power grid. Thereby, in case the amount of electric power being actually generated by the wind farm is comparatively small, most of the power or all the power may be transmitted via the AC power transmission link. Accordingly, if the amount of electric power being actually generated is comparatively large, most of the power or all the power may be transmitted via the DC power transmission link.

Using the central wind farm controller for deciding about the power distribution between the two power transmission links may provide the advantage that apart from the described distribution device no additional hardware is needed for distributing the power to be transmitted to the power grid between the AC power transmission link and the DC power transmission link. In this respect benefit is taken from the matter of fact that the central wind farm controller already knows how much electric power is flowing through its measurement point (i.e. Point of Common Connection, PCC), and will be able decide about the portion of the amount of electric power, which portion is transmitted via the AC power transmission link respectively the DC power transmission link.

According to a further embodiment of the claimed invention the distribution device comprises (a) an electronic control unit for receiving the control signal from the central wind farm controller, (b) a bus bar for collecting electric power generated by the plurality of wind turbines, (c) an AC circuit braking device, which is controlled by the electronic control unit and which is configured for disconnecting at least partially the bus bar from the AC power transmission link, and (d) a DC circuit braking device, which is controlled by the electronic control unit and which is configured for disconnecting at least partially the bus bar from the DC power transmission link.

The AC circuit braking device and/or the DC circuit braking device can be realized e.g. by means of high power semiconductor switching devices such as e.g. an insulated gate bipolar transistor (IGBT), a Gate Turn-Off thyristor (GTO), a MOS Turn-off thyristor (MTO), an integrated Gate-Commutated thyristor (IGCT) or any other type of thyristor.

In order to only partially disconnect the bus bar with the respective power transmission link the circuit braking device can be operated with a Pulse Width Modulation (PWM). Thereby, the ratio between (a) the time duration during which the pulse is at a high or low level compared to (b) the time duration of a full period of the PWM determines the degree of disconnection.

According to a further embodiment of the claimed invention the central wind farm controller is configured for controlling the operation of the wind farm in such a manner that (a) the frequency of an AC electric signal at the bus bar is equal to the frequency of the power grid, (b) the phase angle of the AC electric signal at the bus bar is synchronized to a phase angle of the power grid, and/or (c) the peak voltage of the AC electric signal at the bus bar is equal to the peak voltage of the power grid. This may provide the advantage that the operation reliability of the circuit braking devices can be improved because there will be no or at least only very small voltage differences between the bus bar and the power grid when the circuit braking devices are opened respectively closed. Thereby, a smooth transition between different operational states of the circuit braking devices can be guaranteed.

At this point it is mentioned that the central wind farm controller may act as a superordinate controller for all individual wind turbines of the plurality of wind turbines. Specifically, the central wind farm controller may be connected to an individual control unit of each wind turbine of the plurality of wind turbines. By supervising the individual control units the central wind farm controller may control the operation of the individual wind turbines in a coordinated manner. Specifically, via a wired or wireless data connection to the individual control units, the central wind farm controller can collect operational information regarding the individual wind turbines and transmit appropriate control signals to the respective individual control units.

The central wind farm controller may manage a correction of the overall wind farm power output, such that an appropriate overall power production of the wind farm can be achieved. This is accomplished by a superordinate power setpoint for the overall power production. In order to realize an appropriate overall wind farm power output, based on the superordinate power setpoint an appropriate individual power setpoint has to be determined for each wind turbine. This determination is typically carried out by means of a separate algorithm, which is executed in each individual control unit.

According to a further aspect of the claimed invention there is provided a power transmission system for transmitting electric power generated by a wind farm with a plurality of wind turbines from the wind farm to a substation of a power grid. The provided power transmission system comprises (a) a power distributing system as described above, (b) an AC power transmission link connecting the distribution device with the substation, and (c) a DC power transmission link connecting the distribution device with the substation.

Also the described power transmission system is based on the idea that the generated electric power, which is supposed to be transmitted to the power grid, can be distributed between the two power transmission links. Thereby, an efficient and reliable power connection between the wind farm and the power grid can be realized.

According to an embodiment of the claimed invention the DC power transmission link comprises (a) a rectifier being connected to the distribution device, (b) an inverter connectable to the substation of the power grid, and (c) a DC cable connecting the rectifier and the inverter.

Specifically, the rectifier may be used to convert the high power AC signal, which is provided by the wind farm, into a high power DC signal, which is transmitted via the DC cable. Accordingly, the inverter may be used to convert the high power DC signal, which has been transmitted via the DC cable, into a high power AC signal, which can be fed into the power grid.

The rectifier and/or the inverter may be realized in particular by means of high power semiconductor switching devices such as the above mentioned IGBTs, GTOs, MTOs, IGCTs.

According to a further embodiment of the claimed invention the rectifier and/or the inverter comprises a Voltage Source Converter.

A Voltage Source Converter (VSC) probably represents the most advanced solution in order to compensate for reactive power, because a VSC can provide a rapidly variable source of reactive power. Thereby, it is possible to adjust the respective high power signals in such a manner that a minimum of reactive power is generated, which in known high power transmission solutions typically represents the strongest source of electrical losses.

According to a further embodiment of the claimed invention the rectifier and/or the inverter are controllable with a Pulse Width Modulation technique. This may provide the advantage that known and well established techniques can be used for efficiently controlling the operation of the rectifier and/or the inverter.

The rectifier may be controlled by a control unit, which is assigned to the wind farm. In particular, the rectifier may be controlled directly or indirectly by the central wind farm controller. Further, the inverter may be controlled by another control unit, which is assigned to the power grid. Thereby, the frequency and the phase of the inverted AC signal can be precisely adjusted to respectively match with the signal of the power grid.

According to a further aspect of the claimed invention there is provided a method for distributing electric power generated by a wind farm with a plurality of wind turbines between (a) an AC power transmission link and (b) a DC power transmission link, wherein both power transmission links connect the wind farm to a substation of a power grid. The provided method comprises (a) controlling the operation of the plurality of wind turbines by means of a central wind farm controller, (b) providing a control signal by the central wind farm controller to a distribution device, which is connected at its input side to the wind farm and at its output side to both power transmission links, and (c) distributing the generated electrical power between the AC power transmission link and the DC power transmission link by the distribution device in response to the control signal.

Also the described method is based on the idea that the generated electric power, which is supposed to be transmitted to the power grid, can be distributed between the two power transmission links, wherein the central wind farm controller is responsible for deciding about the amounts of power, which are transmitted via the respective power transmission links. Thereby, an efficient and reliable power connection between the wind farm and the power grid can be realized.

According to a further aspect of the claimed invention there is provided a central wind farm controller for controlling the operation of plurality of wind turbines of a wind farm in a coordinated manner. The provided central wind farm controller is configured for controlling the above described method.

According to a further aspect of the claimed invention there is provided a computer program for distributing electric power generated by a wind farm with a plurality of wind turbines between (a) an AC power transmission link and (b) a DC power transmission link, wherein both power transmission links connect the wind farm to a substation of a power grid. The computer program, when being executed by a data processor, is adapted for controlling and/or for carrying out the above described method.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The claimed invention may be realized by means of a computer program respectively software. However, the claimed invention may also be realized by means of one or more specific electronic circuits respectively hardware. Furthermore, the claimed invention may also be realized in a hybrid form, i.e. in a combination of software modules and hardware modules.

It has to be noted that embodiments of the claimed invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present claimed invention are apparent from the example of embodiment to be described hereinafter and are explained with reference to the example of embodiment. The claimed invention will be described in more detail hereinafter with reference to the example of embodiment but to which the claimed invention is not limited.

BRIEF DESCRIPTION OF THE DRAWING

The FIGURE shows a wind farm being connected to a power grid by means of a parallel connection between a High Voltage Alternating Current (HVAC) link and a High Voltage Direct Current (HVDC) link, wherein a central wind farm controller of the farm decides about a distribution between the amount of power being transmitted via the HVAC link and the amount of power being transmitted via the HVDC link.

DETAILED DESCRIPTION

The FIGURE shows a wind farm 100, which comprises a plurality of wind turbines 110. Each wind turbine 110, which is illustrated as an "X", comprises a not depicted individual control unit and a not depicted electric converter. The electric converter converts in a known manner an asynchronous AC power output, which is provided by a wind driven electric generator of the wind turbine, firstly into a DC power and secondly into a synchronous AC power output with a given AC frequency. The wind farm 100 further comprises a plurality of transformers 112, wherein respectively one transformer 112 is assigned to one wind turbine 100 and connects the respective wind turbine 110 to a bus bar 114. According to the embodiment described here the electric power being generated by respectively four wind turbines 110 is collected at one bus bar 114.

As can be seen from the FIGURE, the bus bars 114 are connected via high voltage cables 116 to a central bus bar 120, which represents the Point of Common Connection (PCC) of the wind farm. The impedance of the high voltage cables 116 are schematically illustrated as impedances 116a.

The wind farm 100 further comprises a central wind farm controller 130, which is connected in a not depicted manner with each one of the individual control units of the wind turbines 110. According to the embodiment described here the central wind farm controller 130 acts as a superordinate controller for all wind turbines 110 of the wind farm 100. By supervising the individual control units the central wind farm controller 130 is capable of controlling the operation of the wind turbines 110 in a coordinated manner. In this context, the central wind farm controller 130 collects operational information regarding the individual wind turbines 110 and transmits appropriate control signals to the respective individual control units.

In the following the power connection between the wind farm 100 respectively the PCC 120 of the wind farm 100 with a substation 180 of a power grid is described. In the FIGURE the substation 180 is schematically illustrated by its Thevenin equivalent voltage source 182 and its Thevenin equivalent impedance 184.

As can be further seen from the FIGURE, the PCC 120 is connected with a distribution device 140 via a central transformer 125. According to the embodiment described here the central transformer 125 increases the voltage from 33 kV (at the PCC 120) to 275 kV at the distribution device 140. By increasing voltage the loss of electric power during its transmission to the substation can be reduced. Of course, also other voltage steps are possible.

The distribution device 140 is connected to a further bus bar 170, which is assigned to the substation 180, via two parallel power transmission links, an AC power transmission link 150 and a DC power transmission link 160. The AC power transmission link 150 comprises an AC cable 151. The DC power transmission link 160 comprises a DC cable 161, a rectifier 162 for converting the AC power signal at the bus bar 144 into a DC power signal and an inverter 164 for converting the DC power signal, which has been transmitted via the DC cable 161, into an AC power signal. Depending on the local circumstances the cables 151, 161 may have a length between one kilometer and 1000 kilometers. According to the embodiment described here the lengths of the cables 151 and 161 is 80 km.

The distribution device 140 comprises a control unit 142, a bus bar 144, an AC circuit braking device 146 and a DC circuit braking device 148. The control unit 142 is capable of controlling the two circuit braking devices 146 and 148 in such a manner that the respective power transmission link 150 respectively 160 is either (a) fully connected to the bus bar 144, (b) completely disconnected from the bus bar 144 or (c) partially disconnected from respectively partially connected to the bus bar 144.

According to the embodiment described here the AC circuit braking device 146 and/or the DC circuit braking device 148 comprise high power semiconductor switching devices, which are controlled with Pulse Width Modulation (PWM) technique. Thereby, the ratio between (a) the time duration during which the pulse is at a high or low level compared to (b) the time duration of a full period of the PWM determines the degree of disconnection respectively the degree of connection.

The central wind farm controller 130 is connected to the distribution device 140 via a data connection 132, which can be a wired and/or a wireless connection. The central wind farm controller 130 provides a control signal 130a for the control unit 142, which, in response to the control signal 130a, distributes the electrical power, which is supposed to be transmitted to the substation 180, between the AC power transmission link 150 and the DC power transmission link 160.

In accordance with the present claimed invention the central wind farm controller 130 is responsible for the control strategy how the wind farm 100 is connected to the substation 180. Since there are two power transmission links 150 and 160 available, there are the following three different modes for connecting the wind farm 100 to the substation 180:

(A) AC mode: Only the AC power transmission link 150 is used, no power is transmitted via the DC power transmission link 160

(B) AC mode: Only the AC power transmission link 160 is used, no power is transmitted via the AC power transmission link 150

(C) Parallel mode: Both power transmission links 150, 160 are used for transmitting electric power being generated by the wind farm 100 to the substation 180

As has already been mentioned above, when using the parallel mode the fraction of the power compared to the total power, which fraction is transmitted via one of the two power transmission links, can be adjusted e.g. by an appropriate PWM signal, which controls the high power semiconductor switching devices of the AC circuit braking device 146 and the DC circuit braking device 148.

According to the embodiment described here, the fraction of the power, which is transmitted via the DC power transmission link 160, depends on the amount of power, which has been generated by the wind farm 100 and which is supposed to be transmitted to the substation 180. Specifically, if the wind farm 100 is producing e.g. at least 80% of its total power capacity the DC power transmission link 160 will be used exclusively. If the actual power production of the wind farm is small, e.g. less than 20% of the total capacity, the AC power transmission link 150 will be used exclusively. Since compared to an AC power transmission, which always comprises a reactive power loss in particular due to the capacity of the respective AC cable, a DC power transmission suffers much less from such power losses. Therefore, for a huge amount of power which is supposed to be transmitted over long distances it is generally advantageous to use the DC power transmission link 160.

Further, by the use of only the DC power transmission link 160 the wind farm 100 is completely isolated from the power grid. This gives the advantage that the voltage in the wind farm 100 is not affected by changes of the voltage in the power grid, caused e.g. by switching actions or remote faults.

When the wind farm 100 produces only a small power only the AC power transmission link 150 is connected. The DC circuit braking device 146 are in a completely blocked state. This is the above defined AC mode. When the power production increases the DC circuit braking device 146 will be at least partially de-blocked such that the power being transmitted via the DC power transmission link 160 is slowly increasing until the power being transmitted via the AC power transmission link 150 will get close to zero. This is the above defined parallel mode. Then the AC circuit braking device 146 completely disconnect the AC power transmission link 150 from the bus bar 144 and the wind farm 100 is isolated from the power grid. This is the above defined DC mode.

Preferably, at the time of performing the isolation of the wind farm 100 from the power grid the converters of each wind turbine 110 are controlled (by the central wind farm controller 130 and the individual control units of each wind turbine 110) in such a way that the AC frequency and AC voltage control within the wind farm 100 will be maintained as prior to the described isolation sequence. This will facilitate a later activation of the AC power transmission link 150.

Specifically, when the power production of the wind farm 100 again decreases below a pre-set level, the AC frequency within the wind farm 100 is synchronized with the AC frequency of the power grid. The synchronization control is maintained by the central wind farm controller 130, which monitors the phases of the AC voltages before the AC power transmission link 150 is set into play. The AC cable 151 is reconnected by the AC circuit braking device 146 (AC-mode). This sequence of switching is a completely automatic control performed by the central wind faint controller 130. Thereby, a smooth transition between the different modes can be guaranteed.

Seen from a contingency perspective the reliability of the connection of the wind farm 100 to the substation 180 is increased by providing two different power transmissions links 150, 160 between the wind farm 100 and the substation 180. For instance in case there is a severe fault which damages the AC cable 151, the control by the central wind farm controller 130 automatically swaps to the DC power transmission link 160 and the power can still be transmitted to the substation 180.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A power distribution system for distributing electric power generated by a wind farm with a plurality of wind turbines between (a) an AC power transmission link and (b) a DC power transmission link, wherein both power transmission links connect the wind farm to a substation of a power grid, the power distribution system comprising:
   a central wind farm controller which is adapted for controlling the operation of the plurality of wind turbines, and
   a distribution device which is connected at its input side to the wind farm and at its output side to both power transmission links, wherein in response to a control signal, which is provided by the central wind farm controller, the distribution device distributes generated electrical power between the AC power transmission link and the DC power transmission link, wherein the control signal depends on the amount of electric power which is generated by the wind farm.

2. The power distributing system as claimed in claim 1, wherein the distribution device comprises: an electronic control unit for receiving the control signal from the central wind farm controller, a bus bar for collecting electric power generated by the plurality of wind turbines, an AC circuit braking device which is controlled by the electronic control unit and which is configured for disconnecting at least partially the bus bar from the AC power transmission link, and a DC circuit braking device which is controlled by the electronic control unit and which is configured for disconnecting at least partially the bus bar from the DC power transmission link.

3. The power distributing system as claimed in claim 2, wherein the central wind farm controller is configured to control the operation of the wind farm such that a frequency of an AC electric signal at the bus bar is equal to the frequency of the power grid, a phase angle of the AC electric signal at the bus bar is synchronized to a phase angle of the power grid, and/or a peak voltage of the AC electric signal at the bus bar is equal to the peak voltage of the power grid.

4. A power transmission system for transmitting electric power generated by a wind farm with a plurality of wind turbines from the wind farm to a substation of a power grid, the power transmission system comprising: a power distributing system as set forth in any one of the preceding claims, an AC power transmission link connecting the distribution device with the substation, and a DC power transmission link connecting the distribution device with the substation.

5. The power transmission system as claimed in claim 4, wherein the power distributing system comprises: a central wind farm controller which is adapted for controlling the operation of the plurality of wind turbines, and a distribution device which is connected at its input side to the wind farm and at its output side to both power transmission links, wherein in response to a control signal, which is provided by the central wind farm controller, the distribution device distributes generated electrical power between the AC power transmission link and the DC power transmission link.

6. The power transmission system as claimed in claim 4, wherein the DC power transmission link comprises: a rectifier connected to the distribution device, an inverter connectable to the substation of the power grid, and a DC cable connecting the rectifier and the inverter.

7. The power transmission system as claimed in claim 6, wherein the rectifier and/or the inverter comprises a Voltage Source Converter.

8. The power transmission system as claimed in claim 7, wherein the rectifier and/or the inverter are controllable with a Pulse Width Modulation technique.

9. A method for distributing electric power generated by a wind farm with a plurality of wind turbines between an AC power transmission link and a DC power transmission link, wherein both power transmission links connect the wind farm to a substation of a power grid, the method comprising:
   controlling an operation of the plurality of wind turbines by a central wind farm controller,
   generating a control signal based on the amount of electric power which is generated by the wind farm,
   providing the control signal generated by the central wind farm controller to a distribution device, which is connected at its input side to the wind farm and at its output side to both power transmission links, and distributing the generated electrical power between the AC power transmission link and the DC power transmission link by the distribution device in response to the control signal.

* * * * *